United States Patent [19]
Abe

[11] Patent Number: 4,724,873
[45] Date of Patent: Feb. 16, 1988

[54] TIRE BEAD WIRE FORMING APPARATUS

[75] Inventor: Norio Abe, Kodaira, Japan

[73] Assignee: Bridgestone Corporation, Tokyo, Japan

[21] Appl. No.: 886,265

[22] Filed: Jul. 16, 1986

[30] Foreign Application Priority Data

Oct. 29, 1985 [JP] Japan ................. 60-243604

[51] Int. Cl.⁴ .............................................. B21F 3/00
[52] U.S. Cl. .................................. 140/92.2; 156/422; 72/442
[58] Field of Search .................. 140/88, 92.2; 245/1.5; 156/422; 242/7.09, 80; 72/442

[56] References Cited

U.S. PATENT DOCUMENTS 2,786,638 3/1957 Fullerton .......................... 242/80
3,475,255 10/1969 Lang ................................. 156/422

FOREIGN PATENT DOCUMENTS 59-187838 10/1984 Japan .
185544 9/1922 United Kingdom ................. 72/442

Primary Examiner—Lowell A. Larson
Attorney, Agent, or Firm—Cushman, Darby & Cushman

[57] ABSTRACT

A tire bead wire apparatus comprising a festoon mechanism for accumulating a bead wire strip, movable bead transferring means for transferring the bead wire strip fed from the festoon mechanism, cutting means for cutting the bead wire strip into predetermined lengths, a rotatable bead former assembly comprising a plurality of different bead formers which are different in diameter in relation to one another, former rotating means for driving the bead formers to rotate about their own axes, means for holding the end portion of the cut bead wire strip against a peripheral surface of the bead former, and pressing means for joining together the end portions of the cut bead wire strip to form an annular bead wire.

8 Claims, 3 Drawing Figures

TIRE BEAD WIRE FORMING APPARATUS

FIELD OF THE INVENTION

The present invention relates in general to a tire bead wire forming apparatus and in particular to an improved tire bead wire forming apparatus for forming an annular bead wire by wrapping a bead wire strip several times around the peripheral surface of an expansible bead former.

SUMMARY OF THE INVENTION

In accordance with an important aspect of the present invention, there is provided a tire bead wire apparatus comprising a festoon mechanism for accumulating a bead wire strip, movable bead transferring means for transferring the bead wire strip fed from the festoon mechanism, cutting means for cutting the bead wire strip into predetermined lengths, a rotatable bead former assembly comprising a plurality of different bead formers which are different in diameter in relation to one another, former rotating means for driving the bead formers to rotate about their own axes, means for holding the end portion of the cut bead wire strip against a peripheral surface of the bead former, and pressing means for joining together the end portions of the cut bead wire strip to form an annular bead wire.

DESCRIPTION OF THE PRIOR ART

A conventional tire bead wire forming apparatus for forming an annular bead wire from a bead wire strip is described in Japanese laid-open publication No. 59-187838 which is assigned to the assignee of the present invention. The conventional tire bead wire forming apparatus comprises a transfer roller for transferring a bead wire strip, a tension roller for imparting a bending force to the bead wire strip transferred from the transfer roller so that the bead wire strip is easily formed into an annular bead wire, bead cutting means for cutting the bead wire strip, a bead former for wrapping the cut bead wire strip therearound to form the annular bead wire, clamping means for holding the leading end portion of the bead wire strip on the peripheral surface of the bead former, and means for holding the leading end portion of the cut bead wire strip.

In such a conventional tire bead wire forming apparatus, only a single bead former of one kind was employed. However, there are bead formers of various different kinds to form different annular bead wires of different diameters. Therefore, in the case bead formers of different kinds are employed in the conventional tire bead wire forming apparatus, it is required to stop the operation of the tire bead wire forming apparatus to change the bead former. For this reason, the change of the bead former has severely restricted and limited the number of the bead wires that are manufactured by this conventional tire bead wire forming apparatus. Also, the bead wire strip is coated with natural rubber by a rubber coating machine prior to the step of processing by the aforementioned tire bead wire forming apparatus. Therefore, it is highly desirable not to stop and start the operation of the tire bead wire forming apparatus in order to maintain the bead wire strip at a desired and accurate configuration. Particularly, this problem is very important in the case tire bead wires of various kinds are produced in small quantities not to increase the stock.

Accordingly, the object of the present invention is to provide an improved tire bead wire forming apparatus which is able to produce different bead wires of different diameters without stopping the operation, thereby improving the efficiency of production.

Another object of the present invention is to provide an improved tire bead wire forming apparatus which is capable of maintaining the flow of the bead wire strip coated with natural rubber by the rubber coating machine at a desired configuration, thereby enchancing the quality of the finished bead wire.

BRIEF DESCRIPTION OF THE DRAWINGS

The drawings of a prior art tire bead forming apparatus and the features and advantages of a tire bead forming apparatus according to the present invention will be more clearly understood from a consideration of the following detailed description in conjunction with the accompanying drawings in which.

DETAILED DESCRIPTION OF THE PREFERRED EMBODIMENT

Figure 1:
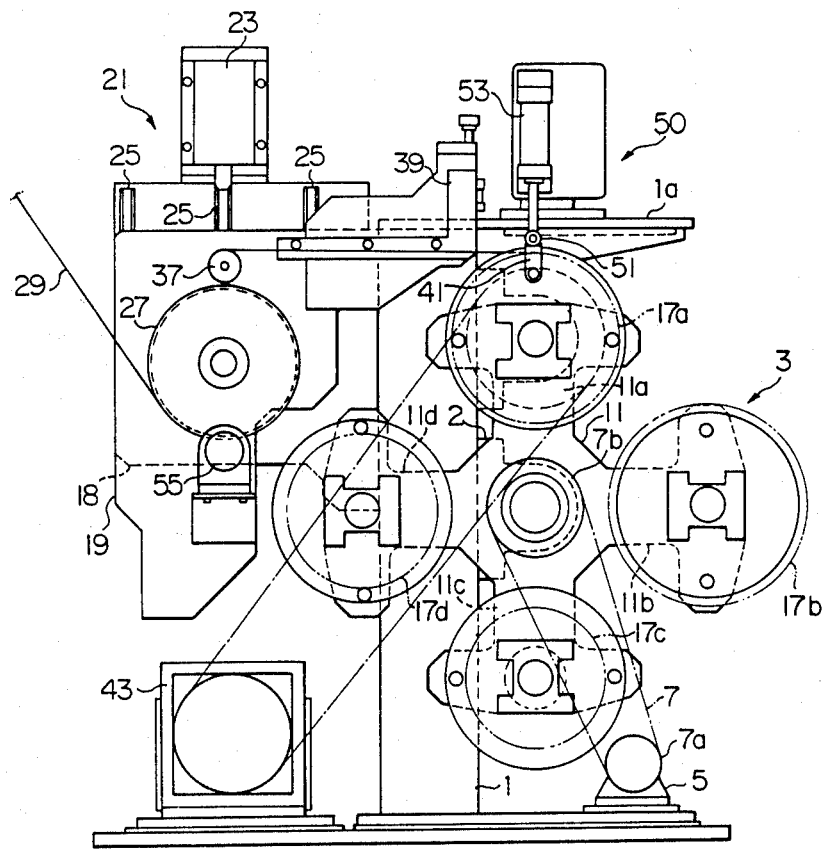
FIG. 1 is a front elevational view showing the tire bead forming apparatus constructed in accordance with one embodiment of the present invention.
Figure 2:
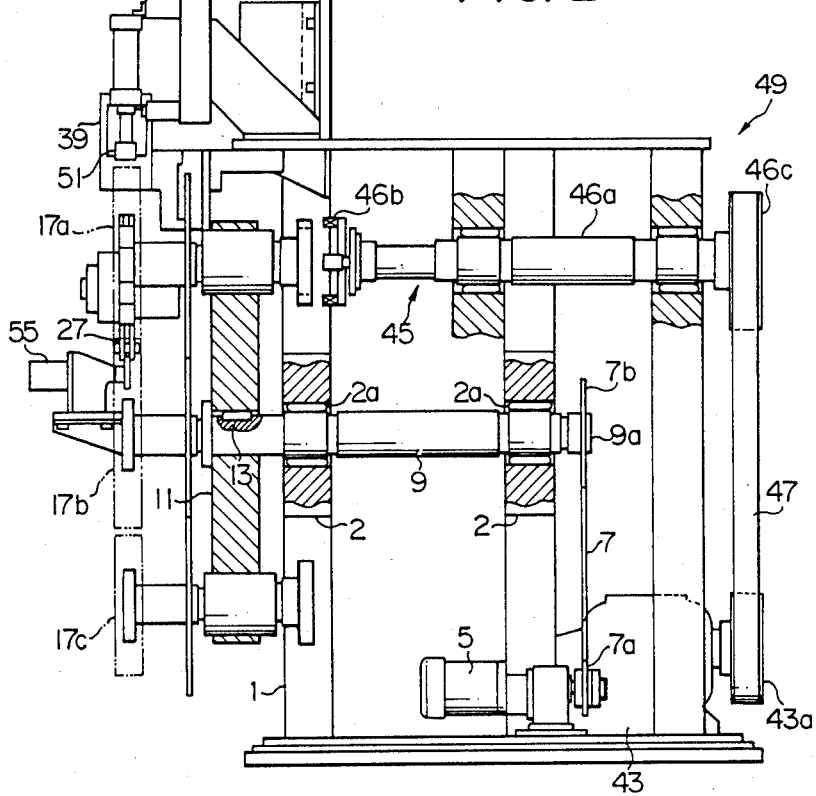
FIG. 2 is a side elevational view, partly broken away, showing the apparatus shown in FIG. 1.

Referring now to the drawings wherein like reference numerals have been used throughout the views to designate the same or similar parts, there is shown in FIGS. 1 and 2, a tire bead wire forming apparatus constructed in accordance with one embodiment of the present invention.

In FIGS. 1 and 2, designated by reference numeral 1 is an upright base structure securely mounted on a factory floor and the like. A rotatable bead former assembly or means generally indicated by reference numeral 3 is rotatably supported to the base structure 1 through bracket members 2 and 2 having bearings 2a and 2a therein, and driven to rotate by former drive means 5 such as an electric motor through an endless chain 7 trained over sprocket wheels 7a and 7b. The bead former assembly 3 comprises a rotatable shaft 9 (FIG. 2) and an arm plate 11 splined to the rotatable shaft 9 through a key 13. The rotatable shaft 9 is rotatably supported by the base structure 1 through the bracket members 2 and 2 and connected at its inner end 9a to the former drive means 5 through the sprocket wheel 7b on the inner end 9a, endless chain 7, and sprocket wheel 7a on the former drive means 5. Thus, the bead former assembly 3 is rotatable about the rotatable shaft 9 with respect to the base structure 1. The arm plate 11 of the bead former assembly 3 is formed with four radially extending arm portions 11a, 11b, 11c and 11d having at their radially outer end portions first, second, third and fourth bead formers 17a, 17b, 17c and 17d, respectively, which are different in diameter in relation to one another. Each of the bead formers 17a, 17b, 17c and 17d is rotatable about its own axis to warp therearound a bead wire strip to be described later. Also, each bead former is radially outwardly expandable and radially inwardly contractable, and has a predetermined diameter indicated by a two-dot line in FIG. 1, when fully expanded.

Figure 3:
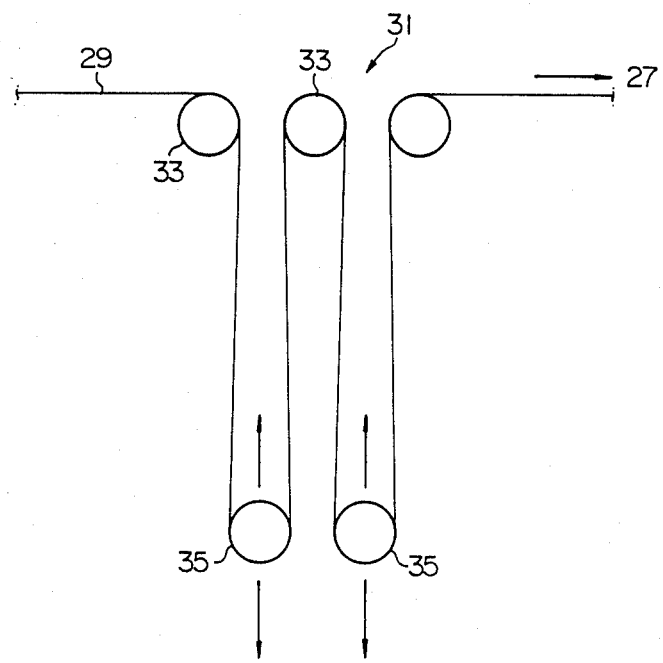
FIG. 3 is a schematic view of a festoon mechanism or accumulator means forming part of the tire bead forming apparatus according to the present invention.

The bead former assembly 3 is stopped its rotation and held at a predetermined position with respect to the base structure 1 through a suitable former positioning pin generally indicated by reference numeral 60. A vertically movable support plate 19 for supporting movable bead transferring means generally designated by reference numeral 21 is movably supported by a stationary side plate 18 fixedly mounted to the base structure 1, and driven to move vertically with respect to the side plate 18 by an electric motor 23 mounted on the side plate 18 through screw means 25 to permit the bead former assembly 3 to be rotated when a different bead wire of different diameter is formed as hereinafter described. On the intermediate portion of the movable support plate 19 is provided a transfer roller 27 for transferring a bead wire strip 29 (coated with natural rubber by a rubber coating apparatus (not shown)) fed from the rubber coating apparatus through a festoon mechanism or accumulator means 31 as shown in FIG. 3. The festoon mechanism or accumulator means 31 comprises a plurality of stationary rollers 33 and a plurality of movable rollers 35 movable with respect to the stationary rollers 33 to accumulate the bead wire strip 29. The movable rollers 35 are lowered by a suitable drive means (not shown). Such movement will continue to accumulate the bead wire strip 29 in the festoon mechanism or accumulator means 31 until one of the movable roller 35 strikes an end limit switch (not shown). The transfer roller 27 for transferring the bead wire strip 29 is driven to rotate about its own axis by drive means (not shown). A tension roller 37 is freely rotatably mounted adjacent the transfer roller 27 and smaller in diameter than the transfer roller 27. The tension roller 37 is adapted to impart a predetermined bending force to the bead wire strip 29 transferred from the transfer roller 27 so that the bead wire strip 29 is readily formed into an annular bead wire. The aforementioned movable support plate 19, transfer roller 27, the drive means for the transfer roller 27, and tension roller 27 as a whole constitute the movable bead transferring means 21. Cutting means 39 for cutting the bead wire strip 29 is provided between the bead transferring means 21 and the bead former assembly 3. The bead wire strip 29 is cut into a predetermined length corresponding to the circumference of the bead former by the cutting means 39. Chuck or clamp means 41 is provided adjacent the bead former 17a which is in a bead forming position as shown in FIG. 1 wherein the bead wire strip 29 is wrapped, to hold the end portion of the bead wire strip 29 cut into the predetermined length by the cutting means 39 on the peripheral surface of the bead former 17a. The chuck means 41 is adapted to hold the end portion of the cut bead wire strip 29 when the expansible bead former is fully expanded from contracted state.

The bead former 17a rotatably supported on the radially upwardly extending arm portion 11a of the bead former assembly 3 is driven to rotate to wrap the bead wire strip 29 therearound by former rotating means generally designated by reference numeral 49. The former rotating means 49 comprises clutch means 45 including a clutch shaft 46a rotatably supported on the base structure 1, a clutch member 46b mounted on one end of the clutch shaft 46a and a pulley 46c carried on the other end of the clutch shaft 46a. The clutch member 46b is engageable with the bead former 17a. The former rotating means 49 further comprises drive means 43 such as an electric motor, which is connected with the clutch shaft 46a of the clutch means 45 through the pulley 46c carried on the clutch shaft 46a, an endless belt 47, and through a pulley 34a on the electric motor 43. Thus, the cut bead wire strip 29 is wrapped around the bead former 17a as it is rotated by the former rotating means 49. Bead pressing means generally indicated by reference numeral 50 is horizontally slideably mounted on an upper frame 1a of the base structure 1 and comprises a press roller 51 adapted to join together the end portions of the cut bead wire strip 29. The bead pressing means 50 further comprises an air cylinder 53 which is adapted to drive the press roller 51 to move vertically away from and toward the bead former 17a to press the bead wire strip 29 transferred onto the bead former 17a from the bead transfer means 21 against the peripheral surface of the bead former 17a. An encoder means 55, which is associated with the cutting means 39, is provided adjacent the transfer roller 27 of the bead transferring means 21. The encoder means 55, through an electrical hardware (not shown), provide a signal which energizes the cutting means 39 to cut the bead wire strip 29 into the predetermined length corresponding to the circumference of the bead former. It should be noted that the operations of the aforementioned means or portions of the bead wire forming apparatus according to the present invention may be automatically controlled and adjusted by a suitable control circuit (not shown).

The operation of the bead wire forming apparatus constructed in accordance with the present invention will hereinafter be described in detail.

As the transfer roller 27 of the transferring means 21 is rotated by the drive means therefor (not shown), the bead wire strip 29 passes through the festoon mechanism or accumulating means 31 from the rubber coating apparatus (not shown) and under the transfer roller 27 and over the top of the tension roller 37. Between the transfer roller 27 and the tension roller 37, the bead wire strip 29 is wrapped around the tension roller 37 in the opposite direction, so that it is imparted a predetermined bending force to be readily formed into an annular bead wire. From the tension roller 37, the bead wire strip 29 is further advanced downward and cut into the predetermined length by the cutting means 39 which received the signal from the encoder means 55. The leading end portion of the cut bead wire strip 29 is held on the peripheral surface of the bead former 17a of the bead former assembly 3 by the chuck or clamp means 41. Thereafter, the bead former 17a is engaged by the clutch member 46b of the clutch means 45 and rotated a predetermined revolutions by the electric motor 43 of the former rotating means 49 and then the chuck means 41 is returned back to its initial position. At this time, the bead wire strip 29 is cut to the predetermined length by the cutting means and further the bead pressing means 50 moves horizontally toward the cutting means 39 while simultaneously pressing the remaining portion of the cut bead wire strip 29 from upward to downward. With such movement of the bead pressing means 50, the remaining portion is firmly wrapped around the bead wire strip 29 which has been wrapped around the bead former 17a, and formed into an annular bead wire. The finished annular bead wire is removed from the bead former 17a after it is radially inwardly contracted from the fully expanded state.

In the case another bead former differing in diameter from the aforementioned first bead former 17a, for example, the second bead former 17b is used, the movable support plate 19 is raised through the screw means 25 by the electric motor 23 on the stationary side plate 18 after the aforementioned former positioning pin 60 is removed. Then, the clutch member 46b of the clutch means 45 is disengaged from the first bead former 17a and the second bead former 17b is rotated 90 degrees upwardly to the bead forming position, wherein the bead wire strip 29 is wrapped, by rotating the rotatable shaft 9 by the former drive means 5 through the sprocket wheel 7a, endless chain 7 and sprocket wheel 7b. After the rotation of the second bead former 17b to the bead forming position, it is engaged by the clutch member 46b of the clutch means 45 and also the former positioning pin is again inserted. The movable support plate 19 is again lowered by the electric motor 23 so that the top of the tension roller 37 becomes substantially equal to the top of the second bead former 17b. Because this bead former changing operation is completed within several ten seconds, the bead wire strip 29 fed from the bead coating apparatus is stored in the festoon mechanism or accumulator means 31 and the flow of the bead wire strip 29 is maintained at a constant speed. Accordingly, the deterioration of the quality of the finished bead wire is prevented which is caused by the start and stop of the flow of the bead wire strip fed from the rubber coating apparatus. In the case the third or fourth bead former 17c is used, the aforementioned cycle is repeated. It is noted that the change of the bead former may be automatically made through switch means by a suitable control means having a predeterminedly set program therein.

While it has been described that the bead wire strip 29 is cut by the cutting means 39 and again cut after wrapped around the bead former, the length of the bead wire strip 29 between the cuts is automatically measured by the encoder means 55 to be substantially equal to the circumference of a bead former to be used. Although it has been described and illustrated in the aforementioned embodiment that the bead former assembly 3 comprises four bead formers, the number of bead formers is not limited to four but may be any number if more than two. Also, in the aforementioned embodiment, while it has been described that the encoder means 30 for measuring the bead wire strip 29 is provided adjacent the transfer roller 27, the encoder means 30 may be provided adjacent the path of the bead wire strip 29.

From the foregoing description, it will be seen that, since the bead former assembly according to the present invention comprises a plurality of bead formers which are different in diameter in relation to one another, the change of the bead former is quickly achieved only by rotating the bead former assembly without stopping the operation, thereby improving the efficiency of the production. Also, because the tire bead forming apparatus according to the present invention is capable of maintaining the flow of the bead wire strip at a constant speed, the bead wire strip coated with natural rubber by the rubber coating machine is maintained at a desired configuration, thereby enhancing the quality of the finished bead wire. Moreover, because of the provision of the encoder means, the bead wire strip is automatically and accurately measured, so that the occurrence of the defective articles of bead wires is effectively prevented.

Other embodiments of the present invention may be used and structural changes may be made without departing from the present invention and purview of the appended claims.

What I claim is:

1. A tire bead wire apparatus comprising:
   a festoon mechanism for accumulating a bead wire strip,
   movable bead transferring means for transferring said bead wire strip fed from said festoon mechanism,
   cutting means for cutting said bead wire strip into predetermined lengths,
   a rotatable bead former assembly comprising a plurality of different bead formers which are different in diameter in relation to one another, the movable bead transferring means being vertically movable so that the feeding height of said bead wire strip corresponds to said different bead formers of different diameters,
   former rotating means for driving said bead formers to rotate about their own axis,
   means for holding the end portion of the cut bead wire strip against a peripheral surface of said bead former, and
   pressing means for joining together the end portions of the cut bead wire strip to form an annular bead wire.

2. A tire bead wire apparatus as set forth in claim 1, further comprising encoder means for measuring said bead wire strip, which is located adjacent the path of said bead wire strip.

3. A tire bead wire apparatus as set forth in claim 1, in which said festoon mechanism comprises a plurality of stationary rollers and a plurality of movable rollers movable with respect to said stationary rollers to accumulate said bead wire strip.

4. A tire bead wire apparatus as set forth in claim 1, in which said movable bead transferring means comprises a support plate movable with respect to said rotatable bead former assembly, a transfer roller mounted on said support plate, and a tension roller adapted to impart a predetermined bending force to said bead wire strip so that said bead wire strip is readily formed into an annular bead wire.

5. A tire bead wire apparatus as set forth in claim 1, in which said rotatable bead former assembly further comprises a rotatable shaft and an arm plate splined to said rotatable shaft, the arm plate being formed with a plurality of radially extending arm portions having said bead formers rotatably mounted thereon.

6. A tire bead wire apparatus as set forth in claim 1, in which each of said bead formers is rotatable about its own axis and radially outwardly expandable and radially inwardly contractable.

7. A tire bead wire apparatus as set forth in claim 1, in which said pressing means is horizontally and vertically movable with respect to said rotatable bead former assembly comprises an air cylinder and a press roller mounted on said air cylinder.

8. A tire bead wire apparatus as set forth in claim 1, further comprising former positioning means for holding said bead former assembly at a predetermined position.

* * * * *